United States Patent Office 3,505,378
Patented Apr. 7, 1970

3,505,378
HALOALKYL-CONTAINING SILICONE FLUIDS
Edgar D. Brown, Jr., Schenectady, N.Y., assignor to General Electric Company, a corporation of New York
No Drawing. Filed Dec. 12, 1966, Ser. No. 600,768
Int. Cl. C07f 7/08
U.S. Cl. 260—448.2
5 Claims

ABSTRACT OF THE DISCLOSURE

An organopolysiloxane composition having the formula:

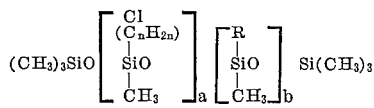

where R is alkyl of at least 8 and not more than 18 carbon atoms, $n$ has a value of from 2 to 6, inclusive, $a$ is an integer equal to at least 1, $b$ has an average value of at least 2.9, the sum of $a$ plus $b$ is from 4 to 40, inclusive, and the ratio of $a$ over $a$ plus $b$ is from about 0.1 to 0.4, and the chlorine atom is attached to a carbon atom other than a silicon-bonded carbon atom. The novel compounds find utility as lubricants.

---

The present invention is directed to a new class of polysiloxane fluids which contain both silicon-bonded higher alkyl radicals and silicon-bonded haloalkyl radicals.

In my copending application Ser. No. 421,588 filed Dec. 28, 1964, now U.S. Patent 3,418,353 and assigned to the same assignee as the present invention, there is described a class of organopolysiloxanes useful for many purposes which comprises triorganosilyl chain-stopped diorganopolysiloxanes in which each silicon atom contains a silicon-bonded higher alkyl radical. Examination of these materials shows that they have very good lubricating characteristics under moderate pressure conditions. However, when these compositions are subjected to extreme pressure lubricating conditions, the fluids are not as good as desired.

The present invention is based on my discovery of a new class of organopolysiloxane compositions of improved lubricity both at moderate pressures and under extreme pressure conditions. These compositions of the present invention are related to those of my aforementioned copending application in that the silicon atoms contain some silicon-bonded higher alkyl radicals, but differ therefrom in that a portion of the silicon atoms in each molecule also contains silicon-bonded chloroalkyl radicals.

The compositions of my invention are liquid triorganosilyl chain-stopped diorganopolysiloxanes containing an average of from about 4 to 40 diorganopolysiloxane units per molecule, with each diorganosiloxane unit containing one silicon-bonded methyl group and with from 60 to 90 percent of the silicon atoms also containing one silicon-bonded alkyl radical containing at least 8 carbon atoms, and with each of the remaining silicon atoms other than terminal silicon atoms also containing a silicon-bonded chloroalkyl radical in which the alkyl group contains from 2 to 6 carbon atoms.

The organopolysiloxane liquids of the present invention can be characterized as having the formula:

(1) 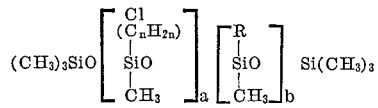

where R is an alkyl radical containing at least 8 carbon atoms, e.g., from 8 to 18 carbon atoms, $n$ is an integer equal to from 2 to 6, inclusive, $a$ has an average value of at least 1, $b$ has an average value of at least about 2.9, the sum of $a$ plus $b$ is equal to from about 4 to 40, inclusive, and the ratio of $a$ to $a$ plus $b$ is equal to from 0.1 to 0.4, inclusive.

From the definitions of the various substituents of Formula 1, it is apparent that the various radicals represented by R can vary from octyl to octadecyl. In the preferred embodiment of my invention, R represents a tetradecyl radical. Also from Formula 1, it is apparent that the chloroalkyl radical attached to the silicon atoms can vary from chloromethyl to chlorohexyl. While it is preferred that the chlorine atom be attached to the omega carbon atom of a normal alkyl radical, it is also possible for the chlorine atom to be attached to a carbon other than the omega carbon atom provided that the chlorine atom is attached to at least the second carbon atom removed from the silicon atom. In addition, the alkyl portion of the chloroalkyl radical itself can be other than normal alkyl, with the isobutyl radical being a relatively common substituent. The preferred radical employed in the practice of my invention is the chloropropyl radical.

The organopolysiloxanes within the scope of the present invention, which will be referred to hereinafter for brevity as the "higher alkyl chloroalkyl fluids," can be prepared by relatively straightforward techniques. The simplest and preferred method involves the preparation of an SiH-containing siloxane by the cohydrolysis and co-condensation of a mixture of trimethylchlorosilane, methyl hydrogen dichlorosilane, and a methylchloroalkyldichlorosilane having the formula:

(2) 

where $n$ is as previously defined. By reacting these chlorosilanes in the ratio of 2 moles of trimethylchlorosilane, $a$ moles of the methylchloroalkyldichlorosilane, and $b$ moles of the methyl hydrogen dichlorosilane, there is produced a trimethylsilyl chain-stopped copolymer of methyl hydrogen siloxane units and methylchloroalkylsiloxane units having the formula:

(3) 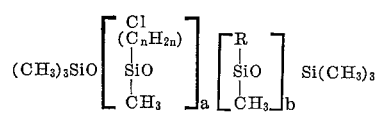

where the terms are as previously defined.

In preparing the polysiloxane of Formula 3 from the three different chlorosilanes, the general method of preparation is to mix the trimethylchlorosilane, the methyl hydrogen dichlorosilane, and the methylchloroalkyldichlorosilane of Formula 3 and to slowly add the mixture of chlorosilanes to a reaction vessel containing an amount of water equal to about 3 times the volume of the chlorosilane mixtures. The addition rate is controlled so that the temperature of the reaction mixture remains at about 50° C. during the addition. Heat may be applied to the reaction vessel if necessary. After the addition is completed, the reaction mixture is allowed to separate into an upper silicone phase and a lower aqueous phase. The aqueous phase is separated and the silicone phase is washed until neutral with water and then dried over sodium sulfate to produce the siloxane fluid of Formula 3.

The hydrogen-containing polysiloxane fluid of formula 3 can be converted to the higher alkyl chloroalkyl fluid of Formula 1 by the addition of the appropriate alpha-olefin to the SiH compound. The appropriate alpha-olefins, of course, are alpha-olefins having the formula:

(4) 

where R' is an alkyl radical containing from 6 to 16 carbon atoms. The particular alpha-olefins within the scope of Formula 4 are illustrated, for example, by octene-1, decylene-1, dodecylene-1, tetradecylene-1, hexadecylene-1, and octadecylene-1.

The reaction between the alpha-olefin of Formula 4 and the polysiloxane of Formula 3 is carried out in the same manner as the same type of reaction which is described in my aforementioned copending application Ser. No. 421,588, which is incorporated by reference into the present application for the details of such reaction. Since the reaction involves one molecule of the alpha-olefin per silicon-bonded hydrogen atom in the polysiloxane of Formula 3, the two reactants are employed in approximately this stoichiometric ratio, but sometimes the olefin is present in a 10 to 20 percent excess.

The reaction is carried out in the presence of concentional SiH-olefin addition catalysts, such as those elemental platinum catalysts described in Patent 2,970,150—Bailey, as well as the platinum compound catalysts described in Patents 2,823,218—Speier et al., 3,159,601—Ashby, 3,159,662—Ashby, and 3,220,972—Lamoreaux. The amount of SiH-olefin addition catalyst employed in effecting reaction between the silicon-hydrogen-containing polysiloxane of Formula 3 and the alpha-olefin of 4 can vary within wide limits. Generally, the catalyst is employed in an amount sufficient to provide one mole of platinum per 1,000 moles of alpha-olefin to one mole of catalyst per million moles of alpha-olefin.

Generally, a mixture is formed of the hydrogen-containing polysiloxane of Formula 3 and a portion of the alpha-olefin of 4 and then the catalyst is added, the temperature of the reaction mixture is increased until the rate of temperature rise becomes greater than that supplied by the heating element, and thereafter the temperature is maintained by controlling the rate of addition of the alpha-olefin. Generally, the reaction temperature is maintained at about 50 to 120° C. When an excess of the alpha-olefin is employed, it is removed from the reaction mixture by distillation.

The following examples are illustrative of the practice of my invention and are not intended for purposes of limitation. In the examples, the various organopolysiloxane fluids described were evaluated for extreme pressure lubrication by means of a Falex lubricant testing machine. A description of this machine and its operation is given in an article by Victor A. Ryan in Lubrication Engineering, September 1946, pages 102 to 104. Essentially, the test performed by the machine involves rotating a shaft between two V-blocks as pressure is applied to the bearing surfaces. The resulting wear of the shaft and the V-blocks is a measure of the lubricating characteristics of the liquid under evaluation. Another measure of the lubricating characteristics of the lubricant under evaluation is obtained by slowly increasing the pressure applied to the bearing surfaces as described in the article. The pressure at which the bearing surfaces seize the rotating shaft is recorded. In the following examples, all parts are by weight.

EXAMPLE 1

A mixture was prepared of 6 g. trimethylchlorosilane, 92 g. methyl hydrogen dichlorosilane, and 25 g. methylchloropropyldichlorosilane. This mixture was added to a reaction vessel containing 350 parts of water, with the addition taking place over a one hour period, while the reaction vessel was maintained at a temperature of 50° C. with stirring. At the end of this time, the reaction mixture was allowed to stand and separate into an upper silicone layer and a lower aqueous layer and the aqueous layer was separated as previously described to form a polysiloxane within the scope of Formula 3 in which $n$ is equal to 3, $a$ is equal to 4.7, and $b$ is equal to 29. To 35.7 parts of this polysiloxane was added 5 parts of tetradecene-1, and 0.0005 part of chloroplatinic acid. The reaction mixture was then heated to a temperature of 100° C. and over a period of one hour, 49.4 more parts of tetradecene-1 (10% excess) was added. This resulted in a methylchloropropyltetradecylpolysiloxane fluid which had the formula:

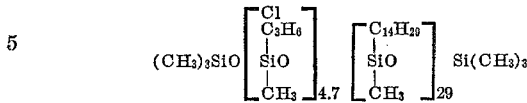

This material was a clear, colorless liquid having a refractive index of 1.457. When this fluid was evaluated in the Falex test described above using 52–100 steel, the wear at a pressure of 500 pounds per square inch after rotating the shaft for 0.5 hour at a speed of 170 r.p.m., was very light. The seizure load was 2500 pounds per square inch. As a comparison, a methyltetradecylpolysiloxane fluid of the same general structure, which was a trimethylsilyl chain-stopped homopolymer of methyltetradecylsiloxane units containing about 40 silicon atoms per molecule, was evaluated for lubricity and showed a heavy wear scar at a pressure of 500 pounds per square inch and showed a seizure load of 750 pounds per square inch.

EXAMPLE 2

Following the procedure of Example 1, a series of trimethylsilyl chain-stopped methylchloropropylsiloxane, methyltetradecylsiloxane fluids were prepared and examined for lubricating characteristics. A first fluid within the scope of Formula 1 in which $a$ was equal to 12 and $b$ was equal to 18 were formed from 10.8 parts trimethylchlorosilane, 103 parts methyl hydrogen dichlorosilane, and 114 parts methylchloropropyldichlorosilane with subsequent addition of tetradecene to the SiH portion of the molecule. Another fluid within the scope of Formula 1, when $a$ was equal to 3 and $b$ was equal to 27 was formed from 10.8 parts trimethylchlorosilane, 155 parts methyl hydrogen dichlorosilane, and 28.7 parts methylchloropropyldichlorosilane. A composition outside of the scope of the present invention by virtue of the ratio of $a$ to $a$ plus $b$ being equal to 0.05 was prepared by the same general procedure from 10.8 parts trimethylchlorosilane, 164 parts methyl hydrogen dichlorosilane, and 14.4 parts methylchloropropyldichlorosilane to produce a product in which $a$ was 1.5 and $b$ was 28.5. Each of these compositions was examined in the Falex test mentioned above, and the table below lists the ratio of subscript $a$ over $a$ plus $b$ for each of these compositions, the seizure load in pounds per square inch and the characteristic of the wear under a pressure of 500 pounds per square inch, using AZSI 1137 V-blocks and SAE 3135 pins.

TABLE

| a/a+b: | Seizure Load, p.s.i. | Wear |
| --- | --- | --- |
| 0 | 300 | Heavy. |
| 0.1 | 525 | Light. |
| 0.2 | 1,000 | Do. |
| 0.4 | 1,100 | Do. |
| 0.05 | 400 | Heavy. |

EXAMPLE 3

Following the procedure of Example 1, a mixture of 12 g. trimethylchlorosilane, 138 g. methyl hydrogen dichlorosilane, and 70 g. methylchlorohexyldichlorosilane was slowly added to 500 parts water which was maintained with stirring at a temperature of 40 to 50° C. The reaction mixture was maintained at this temperature for 2 hours after the addition had been completed and then allowed to cool to room temperature, at which time two layers had formed. The lower aqueous layer was separated and the upper silicone layer was washed with hot aqueous sodium sulfate to neutralize the reaction mixture and was then dried over dry sodium sulfate. To this resulting mixture was then added 13 g. of octene-1 and .05 g. of chloroplatinic acid hexahydrate. The reaction mixture was then heated to a temperature of 100° C. and an additional 134 g. of octene-1 (10% excess) were slowly added and the reaction mixture was maintained at this temperature for 60 minutes. At the end of this time, the temperature was increased to 150° C., the pressure was reduced to 5 mm. to give 150 g. of a composition within the scope of the present invention having the formula:

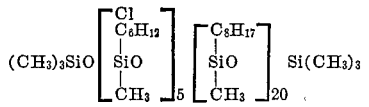

The lubricating characteristics of this clear, colorless fluid were examined in the Falex test and found to be satisfactory.

What I claim as new and desire to secure by Letters Patent of the United States is:

1. An organopolysiloxane composition having the formula:

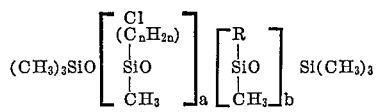

where R is an alkyl radical having from 8 to 18 carbon atoms, $n$ has a value of from 2 to 6, inclusive, $a$ is an integer equal to at least 1, $b$ has an average value of at least 2.9, the sum of $a$ plus $b$ is from 4 to 40, inclusive, and the ratio of $a$ over $a$ plus $b$ is from about 0.1 to 0.4, and the chlorine atom is attached to a carbon atom other than a silicon-bonded carbon atom.

2. A composition of claim 1 in which R is tetradecyl.
3. A composition of claim 1 in which $n$ has a value of 3.
4. A composition of claim 1 in which $n$ has a value of 3 and the chlorine atom is attached to the gamma-carbon atom.
5. A composition of claim 1 in which R is tetradecyl, $n$ has a value of 3, and the chlorine atom is attached to the gamma-carbon atom.

References Cited

UNITED STATES PATENTS

| | | | |
|---|---|---|---|
| 2,768,193 | 10/1956 | Gilbert | 260—448.2 |
| 3,053,873 | 9/1962 | Pepe | 260—448.2 |
| 3,011,987 | 12/1961 | Walton et al. | 260—448.2 XR |

TOBIAS E. LEVOW, Primary Examiner

P. F. SHAVER, Assistant Examiner

U.S. Cl. X.R.

252—49.6